E. LAHTI.
FEED CUTTER.
APPLICATION FILED NOV. 18, 1915.
1,222,110.
Patented Apr. 10, 1917.
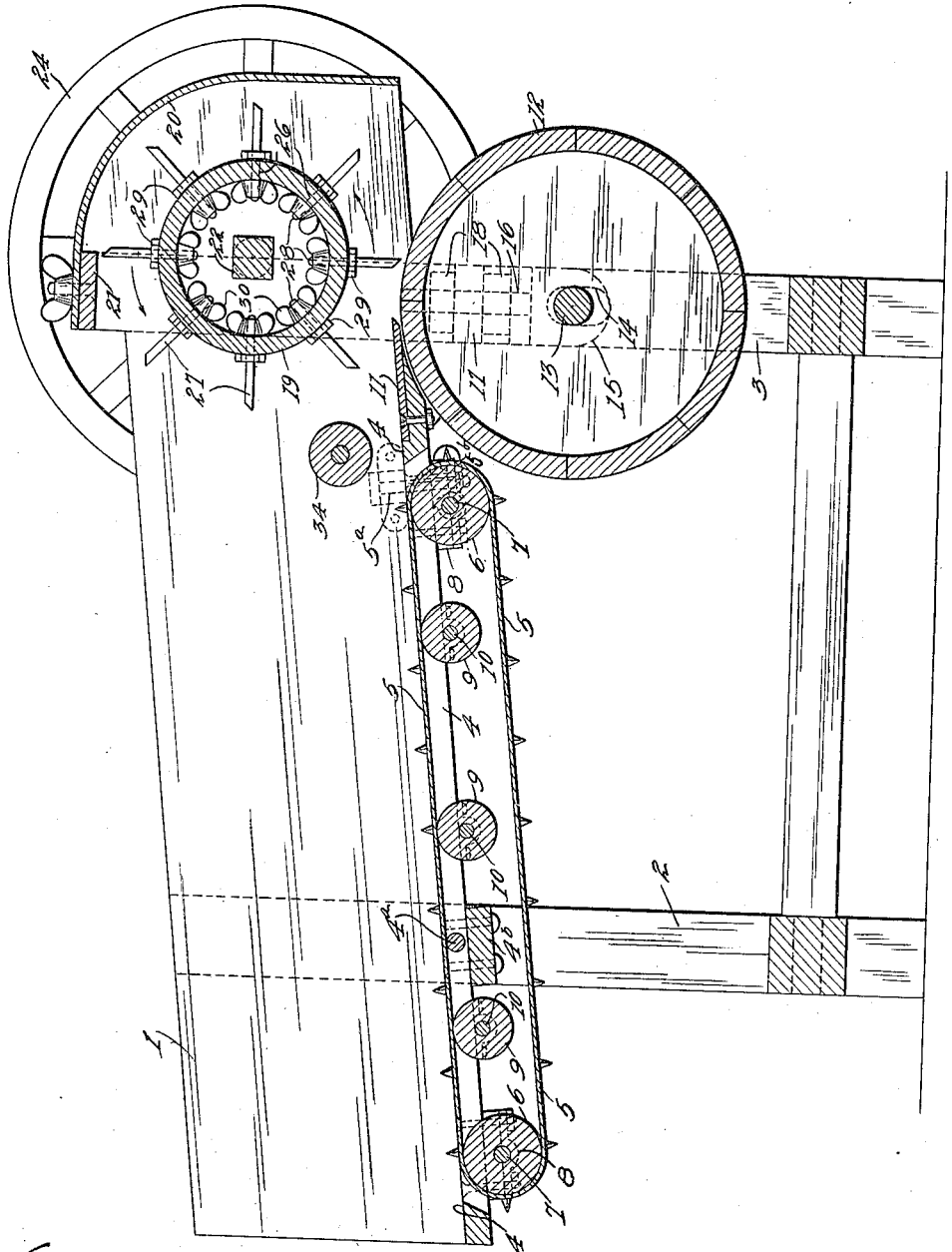
Witnesses
Paul A. Viersen
Otto Melchior
Inventor
E. Lahti
H. J. Sanders
By                        Atty.

UNITED STATES PATENT OFFICE.

ELIAS LAHTI, OF McMURRAY, WASHINGTON.

FEED-CUTTER.

1,222,110. Specification of Letters Patent. Patented Apr. 10, 1917.

Application filed November 18, 1915. Serial No. 62,153.

*To all whom it may concern:*

Be it known that I, ELIAS LAHTI, a citizen of the United States, residing at McMurray, in the county of Skagit and State of Washington, have invented certain new and useful Improvements in Feed-Cutters, of which the following is a specification.

This invention relates to improvements in feed cutters and its objects are to provide for a variable cut of the feed; and to provide a hand-operated machine that is easy to operate and efficient in use. With the foregoing and other objects in view the invention consists in the combination and arrangement of parts to be hereinafter fully described in the following specification, pointed out in the claim and illustrated in the accompanying drawing which forms a part of said specification.

The illustration is a vertical sectional view of my improved feed cutter.

The reference numeral 1 designates a feed trough supported upon legs 2, 3 and provided with a floor 4 which is not connected directly to the side walls of the trough but is fulcrumed upon a shaft 4ª which extends through the floor 4 and into the legs 2 and which is retained in adjusted position with relation to the sides of the trough by means of the bolt 5ª carried by a bearing secured to said sides for engagement with the wing nut 5ᵇ carried by conveyer 5; said floor being cut away throughout the greater portion of its length, the cut out portion being bridged by a beam 4ᵇ secured terminally to the floor, to permit the installation of the conveyer 5 which is supported and driven by the terminal rollers 6, 6 fast upon the shafts 7, 7 journaled in bearings 8 secured to the floor 4. Auxiliary rollers 9 loose upon the shafts 10 journaled in bearings secured to the floor 4 also serve as supports for said conveyer.

To one end of the floor 4 a knife 11 is secured which projects beyond the end thereof and over a guide roller 12 arranged upon a shaft 13 which extends through elongated perforations 14 in the legs 3 and is journaled in bearings 15 carried by screws 16 which are adjustably secured in the brackets 17 by means of the nuts 18; said brackets being carried by the legs 3. Above the guide roller 12 a drum 19 is arranged within the hood 20, the sides of said hood being a continuation of the sides of the trough, said hood being supported by a cross beam 21 connected to the legs 3. The said drum 19 is fast upon a shaft 22 which extends through the sides thereof and is carried by the legs 3 and upon the ends of which the wheels 24 are secured provided with suitable cranks to rotate same and drive said shaft. Referring again to the drum 19 the same is formed with a plurality of longitudinal slots 26 adapted to receive the knives 27 formed with screw shanks 28, whereon nuts 29 are arranged, that extend through the drum 19 and within the same are provided with the wing nuts 30 whereby said knives may be adjusted with relation to the drum; the greater the projection of the knives beyond the outer periphery of the drum the finer the feed will be cut.

The shaft 22 is suitably connected, as by sprocket wheels and chain (not shown) to a projection of one conveyer shaft 7 to enable the conveyer to be driven by power from the said shaft 22. The feed to be cut is introduced at the open end of the trough upon the conveyer 5 which carries it toward the knives at the opposite end of the trough; the feed passes below the guide roller 34 and between the knives 27 and knife 11 and is cut and then it passes over the guide roller 12 and drops into a receptacle (not shown) when it may be removed. The blades 27 in rotating with the drum 19 barely touch the blade 11 as they cut the feed. To effect a very coarse cut the blades are drawn farther into the drum by means of their nuts 29 and screws 30, the knife-bearing end of the floor 4 and the conveyer are raised by means of the bolt 5ª, provided with a nut that rests upon the bearing through which said bolt passes, and the wing nut 5ᵇ in engagement with said bolt, and the guide roller 12 is raised by raising the screws 16 in their bearings. A relatively fine cut is effected by reversing this operation just described.

What is claimed is:—

In a feed cutter comprising a trough having cutting mechanism at one of its ends, a floor fulcrumed in said trough and adjustable with relation thereto and having a cutter bar secured thereto at its front end, a conveyer carried by and adjustable with said floor, and means connecting said trough and floor for releasably retaining said members in adjusted relation.

In testimony that I claim the foregoing as my own I have hereto affixed my signature in the presence of two subscribing witnesses.

ELIAS LAHTI.

Witnesses:
ELMER WAGLUND,
JOHN LUND.

Copies of this patent may be obtained for five cents each, by addressing the "Commissioner of Patents, Washington, D. C."